US012387667B2

(12) United States Patent
Wang et al.

(10) Patent No.: US 12,387,667 B2
(45) Date of Patent: Aug. 12, 2025

(54) PIXEL CIRCUIT

(71) Applicant: AUO Corporation, Hsinchu (TW)

(72) Inventors: Cheng-Kuang Wang, Hsinchu (TW); Syuan-Ying Lin, Hsinchu (TW)

(73) Assignee: AUO CORPORATION, Hsinchu (TW)

( * ) Notice: Subject to any disclaimer, the term of this patent is extended or adjusted under 35 U.S.C. 154(b) by 0 days.

(21) Appl. No.: 18/929,685

(22) Filed: Oct. 29, 2024

(65) Prior Publication Data

US 2025/0201176 A1 Jun. 19, 2025

(30) Foreign Application Priority Data

Dec. 18, 2023 (TW) ................................ 112149331

(51) Int. Cl.
*G09G 3/32* (2016.01)

(52) U.S. Cl.
CPC ....... *G09G 3/32* (2013.01); *G09G 2300/0866* (2013.01); *G09G 2330/023* (2013.01)

(58) Field of Classification Search
CPC ............. G09G 3/32; G09G 2300/0866; G09G 2330/023
See application file for complete search history.

(56) References Cited

U.S. PATENT DOCUMENTS

| | | | | |
|---|---|---|---|---|
| 2019/0287462 | A1 | 9/2019 | Zhou | |
| 2021/0375205 | A1* | 12/2021 | Dong | G09G 3/3291 |
| 2022/0051619 | A1 | 2/2022 | Shiau et al. | |
| 2023/0186834 | A1* | 6/2023 | Liu | G09G 3/32 345/55 |
| 2024/0153442 | A1* | 5/2024 | Li | G09G 3/3233 |
| 2024/0203361 | A1* | 6/2024 | Meng | G09G 3/3275 |

FOREIGN PATENT DOCUMENTS

| | | |
|---|---|---|
| TW | I848658 B | 7/2024 |

* cited by examiner

*Primary Examiner* — Andrew Sasinowski
(74) *Attorney, Agent, or Firm* — WPAT, PC

(57) ABSTRACT

Pixel circuit includes light emitting element, driving transistor, capacitor, writing circuit, first transistor and second transistor. Light emitting element is coupled to first system voltage source. Driving transistor is coupled to first node, second node and second system voltage source. Capacitor and writing circuit are coupled to second node and third node. Writing circuit writes a data voltage and an initial voltage to both terminals of capacitor according to a control signal. First transistor is coupled between driving transistor and light emitting element, and is conducted in response to a driving signal. Second transistor is coupled to first node and third node, and is conducted in response to driving signal to change data voltage and initial voltage at both terminals of capacitor to conduct driving transistor to generate a driving current between two system voltage sources, flowing through driving transistor and first transistor, to light up light emitting element.

15 Claims, 6 Drawing Sheets

PIXEL CIRCUIT

CROSS-REFERENCE TO RELATED APPLICATION

This application claims priority to Taiwan Application Serial Number 112149331, filed Dec. 18, 2023, which is herein incorporated by reference in its entirety.

BACKGROUND

Field of Invention

The present disclosure relates to a display device. More particularly, the present disclosure relates to a pixel circuit applied to transparent field sequential color (FSC) display panels.

Description of Related Art

Conventional mini light light-emitting diode (mini LED) require large driving currents. A power supply voltage that generates the driving current is prone to current errors, resulting in different voltages for each of pixels, causing errors in output currents.

In addition, in the conventional pixel circuit, when a micro-light emitting diode needs to output high brightness, a pixel circuit needs to generate a large current. When a large current flows through a path between two power supply voltages, the greater a number of transistors between two power supply voltages, the higher a power consumption between two power supply voltages. In addition, when a system voltage source outputs the same system voltage to pixel circuits at different distances, a resistance of each of wirings increases as the distance increases, causing a current to drop more.

For the foregoing reasons, there is a need for providing a pixel circuit to solve the above problems encountered in related art approaches.

SUMMARY

One aspect of the present disclosure provides a pixel circuit. The pixel circuit includes a light emitting element, a driving transistor, a capacitor, a writing circuit, a first transistor and a second transistor. The light emitting element is coupled to a first system voltage source. The driving transistor is coupled to a first node, a second node and a second system voltage source. The capacitor is coupled to the second node to a third node. The writing circuit is coupled to the second node and the third node, and is configured to write a data voltage and an initial voltage to both terminals of the capacitor respectively according to a control signal at a first stage. The first transistor is coupled between the driving transistor and the light emitting element, and is conducted in response to a driving signal at a second stage. The second transistor is coupled to the first node and the third node, and is conducted in response to the driving signal at the second stage to change the data voltage and the initial voltage at both terminals of the capacitor so that the driving transistor is conducted to generate a driving current between the first system voltage source and the second system voltage source, flowing through the driving transistor and the first transistor to light up the light emitting element.

Another aspect of the present disclosure provides a pixel circuit. The pixel circuit includes a first light emitting element, a driving transistor, a capacitor, a writing circuit, a first driving circuit, a second light emitting element and a second driving circuit. The first light emitting element is couple to a first system voltage source. The driving transistor is coupled to a first node, a second node and a second system voltage source. The capacitor is coupled to the second node and a third node. The writing circuit is coupled to the second node and the third node, and is configured to write an initial voltage and a first data voltage to both terminals of the capacitor respectively according to a control signal at a first stage terminal. The first driving circuit is coupled to the first node and the third node, and is conducted in response to a first driving signal at a second stage to change the initial voltage and the first data voltage at both terminals of the capacitor at the first stage, so as to conduct the driving transistor, to light up the first light emitting element. The second light emitting element is coupled to the first system voltage source. The second driving circuit is coupled to the first node and the third node. The writing circuit is configured to write the initial voltage and a second data voltage to both terminals of the capacitor according to the control signal at a third stage. The second driving circuit is conducted in response to a second driving signal at a fourth stage to change the initial voltage and the second data voltage at both terminals of the capacitor at the third stage so as to conduct the driving transistor to light up the second light emitting element.

In view of the aforementioned shortcomings and deficiencies of the prior art, the present disclosure provides a pixel circuit. Through a design of a pixel circuit of the present disclosure, a voltage difference between system voltage sources of a pixel circuit can be reduced, thereby reducing power consumption.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
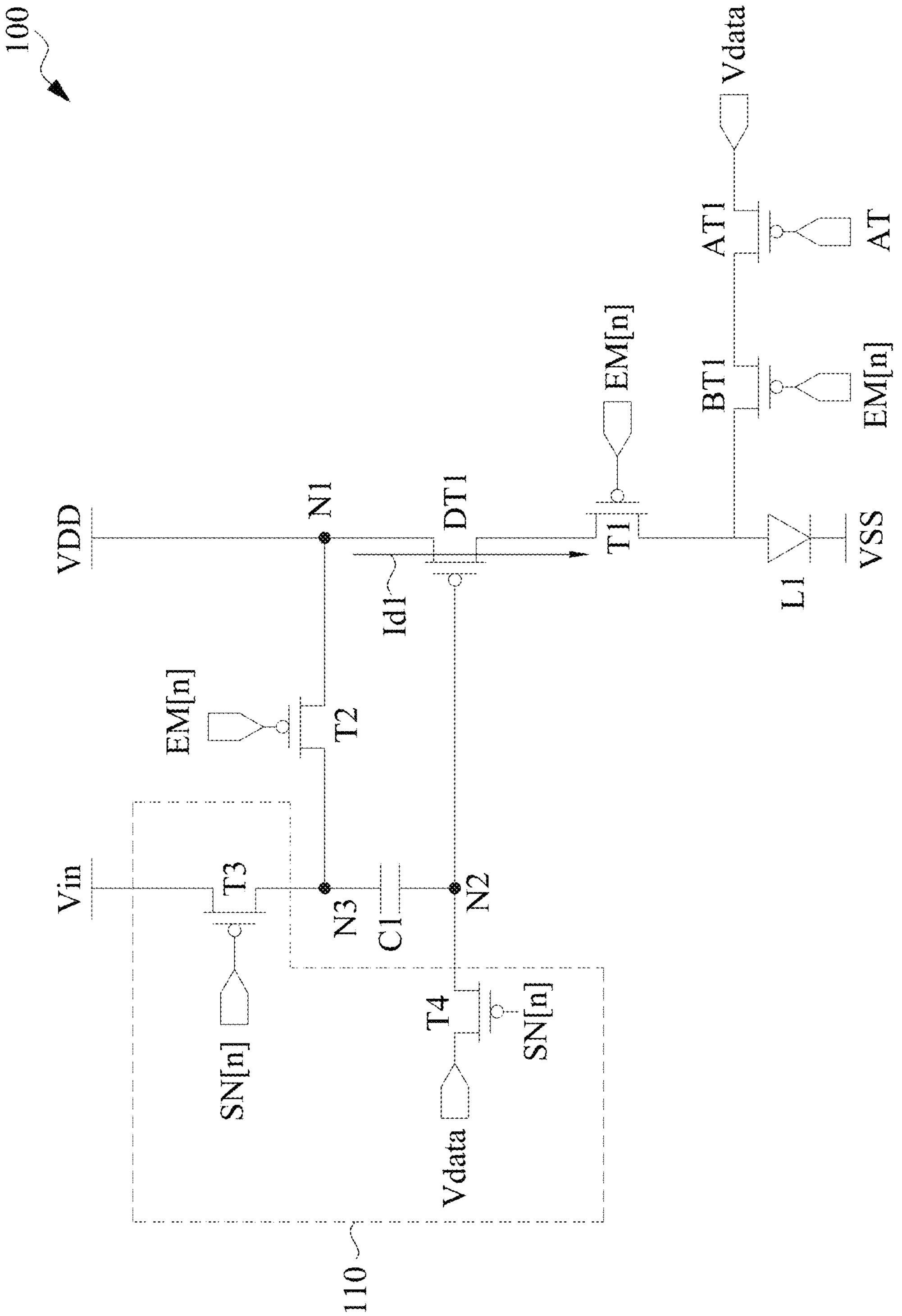
FIG. 1 depicts a schematic diagram of a pixel circuit according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Conventional method of driving micro-light emitting diodes is to use a plurality of signal lines (such as data lines) in a display device to simultaneously input gray-scale voltages to sub-pixel circuits corresponding to three primary colors of light to achieve a target display screen of mixed colors. However, when a micro-light emitting diode needs to output high brightness, a pixel circuit needs to generate a large current. When a large current flows through a path between two power supply voltages, the greater a number of transistors between two power supply voltages, the higher a power consumption between two power supply voltages. Following paragraphs of the present disclosure will describe how to improve the aforementioned problems.

FIG. 1 depicts a schematic diagram of a pixel circuit pixel circuit 100 according to some embodiments of the present disclosure. In one embodiment, the pixel circuit 100 includes a light emitting element L1, a driving transistor DT1, a capacitor C1, a writing circuit 110, a transistor T1, a transistor T2, a bypass transistor BT1 and a detecting transistor AT1. Please start from a top side and a right side of each of components in the picture as a first terminal, the light emitting element L1 includes a first terminal and a second terminal. The second terminal of the light emitting element L1 is coupled to a system voltage source VSS. The transistor T1 is coupled between the light emitting element L1 and the driving transistor DT1.

The driving transistor DT1 includes a first terminal, a second terminal and a control terminal. The first terminal of the driving transistor DT1 is coupled to the node N1 and a system voltage source VDD. The second terminal of the driving transistor DT1 is coupled to the transistor T1. The control terminal of the driving transistor DT1 is coupled to the node N2.

The transistor T1 includes a first terminal, a second terminal and a control terminal. The first terminal of the transistor T1 is coupled to the second terminal of the driving transistor DT1. The second terminal of the transistor T1 is coupled to the first terminal of the light emitting element L1. The control terminal of the transistor T1 is configured to receive a driving signal EM[n]. The transistor T1 is conducted in response to the driving signal EM[n].

The transistor T2 includes a first terminal, a second terminal and a control terminal. The first terminal of the transistor T2 is coupled to the node N1, the system voltage source VDD and the first terminal of the driving transistor DT1. The second terminal of the transistor T2 is coupled to the node N3. The control terminal of the transistor T2 is configured to receive the driving signal EM[n]. The transistor T2 is conducted in response to the driving signal EM[n].

The capacitor C1 includes a first terminal and a second terminal. The capacitor C1 is coupled to the node N2 and the node N3. The first terminal of the capacitor C1 is coupled to the node N3. The second terminal of the capacitor C1 is coupled to the node N2.

Please continue to refer to FIG. 1, the writing circuit 110 is coupled to the node N2 and the node N3. The writing circuit 110 includes a transistor T3 and a transistor T4. The transistor T3 includes a first terminal, a second terminal and a control terminal. The first terminal of the transistor T3 is coupled to an initial voltage source Vin, and is configured to receive an initial voltage from the initial voltage source Vin. The second terminal of the transistor T3 is coupled to the capacitor C1 and the node N3. The control terminal of the transistor T3 is configured to receive a control signal SN[n]. The transistor T3 is conducted in response to the control signal SN[n].

The transistor T4 includes a first terminal, a second terminal and a control terminal. The first terminal of the transistor T4 is coupled to the capacitor C1. The second terminal of the transistor T4 is configured to receive a data voltage Vdata from a data line (not shown in the figure). The control terminal of the transistor T4 is configured to receive a control signal SN[n]. The control terminal of the transistor T4 is conducted in response to the control signal SN[n].

The bypass transistor BT1 includes a first terminal, a second terminal and a control terminal. The first terminal of the bypass transistor BT1 is coupled to the detecting transistor AT1. The second terminal of the bypass transistor BT1 is coupled to the light emitting element L1. The control terminal of the bypass transistor BT1 is configured to receive the driving signal EM[n]. The bypass transistor BT1 is conducted in response to the driving signal EM[n].

The detecting transistor AT1 includes a first terminal, a second terminal and a control terminal. The second terminal of the detecting transistor AT1 is coupled to the first terminal of the bypass transistor BT1. The control terminal of the detecting transistor AT1 is configured to receive a detection control signal AT. The detecting transistor AT1 is conducted in response to the detection control signal AT.

In one embodiment, the driving transistor DT1, the transistors T1 to T4, bypass transistor BT1 and the detecting transistor AT1 can be implemented as P-type Metal-Oxide-Semiconductor Field-Effect Transistor (PMOS). However, types of the aforementioned transistors can be design according to actual needs and are not limited to the embodiments of the present disclosure.

Figure 2:
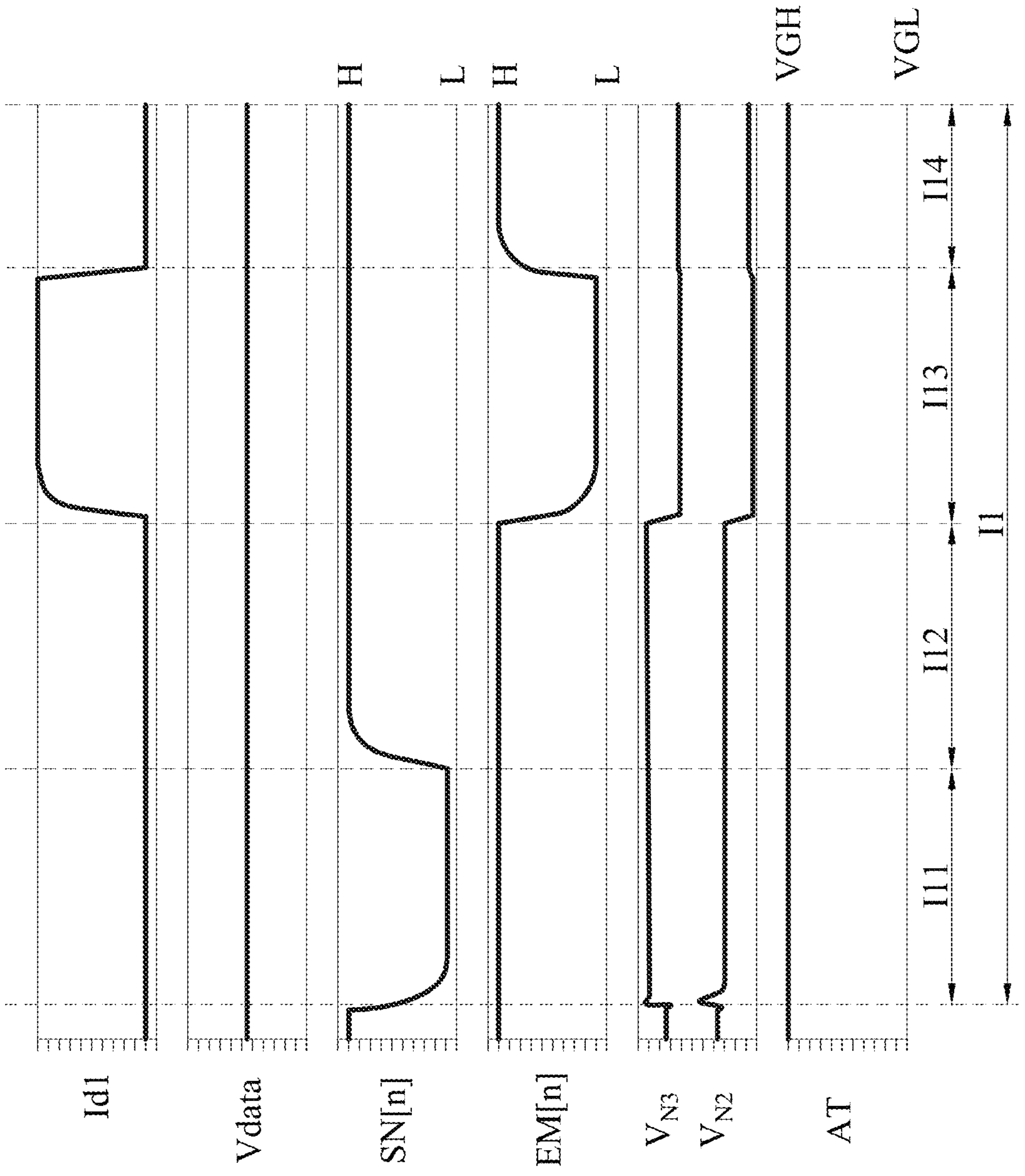
FIG. 2 depicts a signal timing diagram of a pixel circuit at a display stage according to some embodiments of the present disclosure.

In some embodiments, in order to facilitate the understanding operation of the pixel circuit 100 in FIG. 1, please refer to FIG. 2. FIG. 2 depicts a signal timing diagram of the pixel circuit 100 in FIG. 1 at a display stage I1 according to some embodiments of the present disclosure. The display stage I1 consists of stages I11 to I14.

In some embodiments, please refer to FIG. 1 and FIG. 2, at the stage I11 of the display stage I1, the control signal SN[n] is at a low level L. The driving signal EM[n] is at a high level H. The control signal SN[n] writes the initial voltage of the initial voltage source Vin to the first terminal of the capacitor C1 (i.e. the node N3) through the transistor T3 of the writing circuit 110. The control signal SN[n] writes the data voltage Vdata to the second terminal of the capacitor C1 (i.e. the node N2) from the data line (not shown in the figure) through the transistor T4 of the writing circuit 110. At this time, a voltage level of the node N2 changes as the voltage level $V_{N2}$ shown in FIG. 2. A voltage level of the node N3 changes as the voltage level $V_{N3}$ shown in FIG. 2.

For example, the initial voltage of the initial voltage source Vin written by the writing circuit 110 to the node N3 is 10V. The data voltage Vdata of the data line written by the writing circuit 110 to the node N2 is 4V. At this time, the voltage level $V_{N3}$ is 10V. The voltage level $V_{N2}$ is 4V. The capacitor C1 is configured to store a voltage difference of the node N2 and the node N3. It should be noted that since the data voltage Vdata is greater than a threshold voltage of the driving transistor DT1, and the driving transistor DT1 is turned off at this time.

Please refer to FIG. 1 and FIG. 2, at the stage I12 of the display stage I1, the control signal SN[n] and the driving signal EM[n] are both at the high level H. At this time, the driving transistor DT1, the transistors T1 to T4, the bypass transistor BT1 and the detecting transistor AT1 are all in a turned off state, to maintain the voltage level $V_{N2}$ and the voltage level $V_{N3}$ at both terminals of the capacitor C1 at the stage I11. It should be noted that a purpose of setting stage I12 is to prevent a signal delay of the control signal SN[n] from affecting the following circuit operation of the pixel circuit 100. In other words, when the control signal SN[n] changes from the low level L to the high level H, the stage I12 is configured to prevent the transistor T3 and the transistor T4 of the writing circuit 110 from being completely turned off, resulting in short circuit and other abnormal situations in a circuit.

At the stage I13 of the display stage I1, the driving signal EM[n] is at the low level L. The control signal SN[n] is at the high level H. The driving signal EM[n] changes the voltage level $V_{N3}$ of the node N3 through the transistor T2 and the system voltage of the system voltage source VDD. At this time, the capacitor C1 changes the voltage level $V_{N2}$ of the node N2 in response to the voltage level $V_{N3}$ of the node N3, thereby making the voltage level $V_{N2}$ meet the turn-on condition of the driving transistor DT1. For example, the system voltage of the system voltage source VDD is 7.6V. The voltage level $V_{N3}$ of the node N3 drops from 10V to 7.6V. At this time, the capacitor C1 changes the voltage level $V_{N2}$ of the node N2 in response to the change of the voltage level $V_{N3}$ of the node N3. The voltage level $V_{N2}$ of the node N2 drops from 4V to 1.6V. The driving transistor DT1 is conducted in response to the low voltage of the voltage level $V_{N2}$ of the node N2.

Then, after the driving transistor DT1 is conducted, the driving signal EM[n] generates a driving current Id1 between the system voltage source VDD and system voltage source VSS through the transistor T1 and the driving transistor DT1, flowing through transistor T1 and driving transistor DT1 to light up the light emitting element L1. For example, the driving current Id1 is 50 microamperes.

It should be noted that, please refer to FIG. 1, a path between the system voltage source VDD and the system voltage source VSS of the conventional pixel circuit has at least three transistors and light emitting elements, and conventional pixel circuit requires the system voltage source VDD to provide a voltage of 9V to generate the driving current Id1 of 50 microamperes (μA) driving current Id1. In contrast, the pixel circuit 100 of the present disclosure only requires two transistors (i.e. the driving transistor DT1 and the transistor T1) and the light emitting element L1, and only requires the system voltage source VDD to provide a voltage of 7.6V to generate the driving current Id1 of 50 microamperes. Under the same current value, the design of the pixel circuit 100 of the present disclosure saves about 16% of power. In addition, the pixel circuit 100 of the present disclosure can also enable the system voltage source VDD to provide a voltage of 9V to generate a higher current value of the driving current Id1. It should be further noted that the current value of the aforementioned driving current Id1 and the voltage value of the system voltage can be design according to actual needs and are not limited to the embodiments of the present disclosure.

At the stage I14 of the display stage I1, the control signal SN[n] and the driving signal EM[n] are at the high level H. At this time, the driving transistor DT1, the transistors T1 to T4, the bypass transistor BT1 and the detecting transistor AT1 are all in a turned off state. It should be noted that a setting purpose of the stage I14 is similar to a setting purpose of the stage I12, and repetitious detailed descriptions are omitted here.

Figure 3:
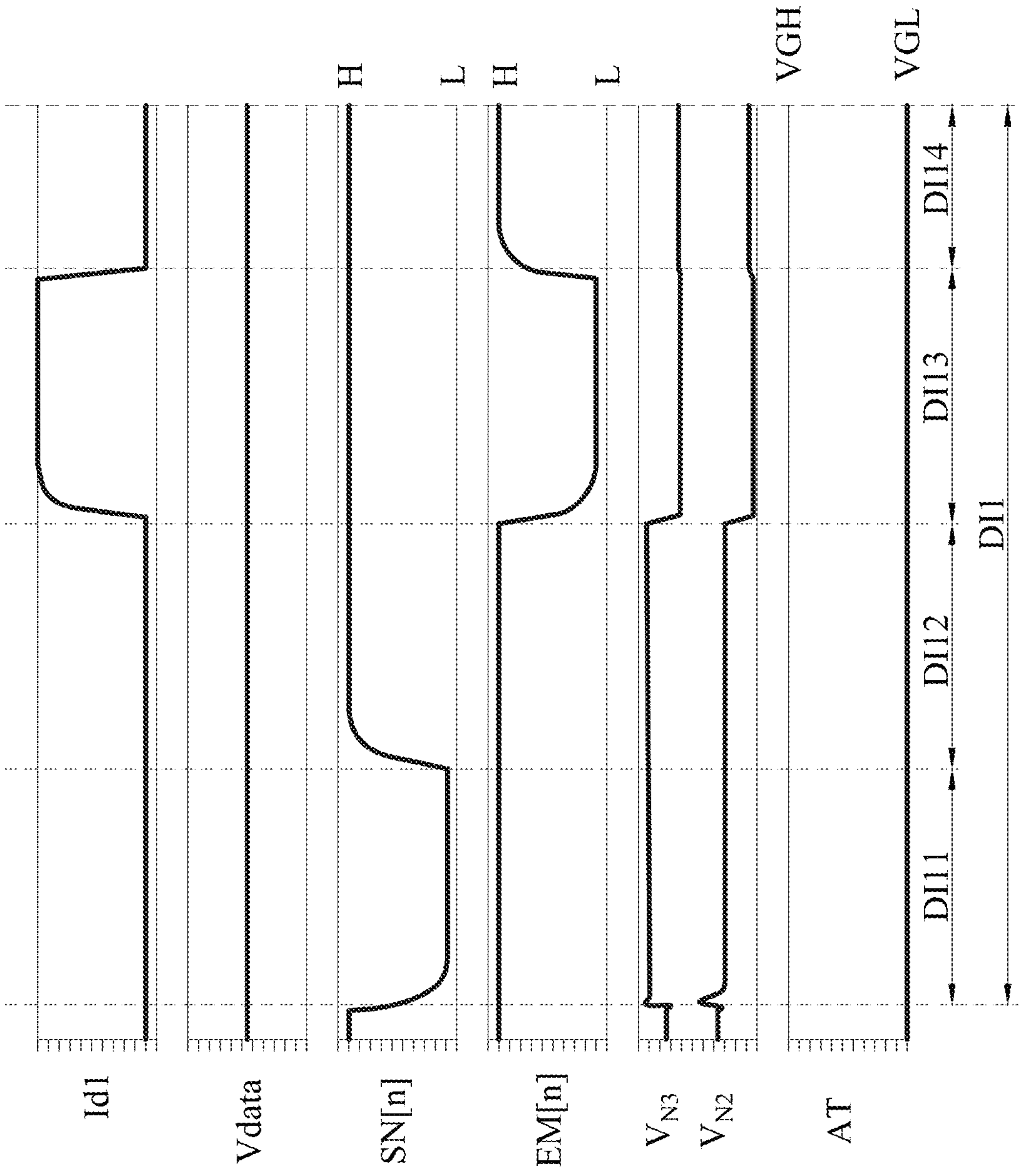
FIG. 3 depicts a signal timing diagram of a pixel circuit at a detecting stage according to some embodiments of the present disclosure.

FIG. 3 depicts a signal timing diagram of the pixel circuit 100 in FIG. 1 at a detecting stage DI1 according to some embodiments of the present disclosure. The detecting DI1 consists of the stages DI11 to DI14. Operations of the pixel circuit 100 at the stages DI11 to DI14 of the detecting stage DI1 are respectively similar to the operations of the pixel circuit 100 at the stages I11 to I14 of the display stage I1. For the sake of brevity, only the differences are described below.

Please refer to FIG. 1 to FIG. 3, at the stage DI13 of the detecting stage DI1, the detection control signal AT is at the low level VGL. The driving signal EM[n] is at the low level L. The detection control signal AT and the driving signal EM[n] bypass the driving current Id1 to the data line (not shown in the figure) through the bypass transistor BT1 and the detecting transistor AT1 respectively, so as to determine whether the pixel circuit 100 is operating normally through a waveform and a value of the driving current Id1.

There are two differences between the stage I13 of the display stage I1 and the stage DI13 of the detecting stage DI1. A first difference is that the detection control signal AT has different levels. In detail, the detection control signal AT at the stage I13 of the display stage I1 is at a high level VGH. The detection control signal AT at the stage DI13 of the detecting stage DI1 is at a low level VGL. A second difference is that a path through which the driving current Id1 flows is different. In detail, the driving current Id1 of the stage I13 of the display stage I1 flows the driving transistor DT1, the transistor T1 and the light emitting element L1 in sequence. The driving current Id1 of the stage DI13 of the detecting stage DI1 flows the driving transistor DT1, the transistor T1, the bypass transistor BT1 and the detecting transistor AT1 to data line (not shown in the figure).

In addition, when a voltage source of a conventional pixel device outputs the same voltage to pixel circuits with different distances, a resistance of each of wirings increase as distance increase, causing a current to drop more. Through a design of the pixel circuit 100 in FIG. 1 of the present disclosure, when a voltage source of a conventional pixel device outputs the same voltage to pixel circuits 100 with different distances, differences in driving current Id1 between pixel circuits 100 with different distances will also obtain a certain compensation effect.

Figure 4:
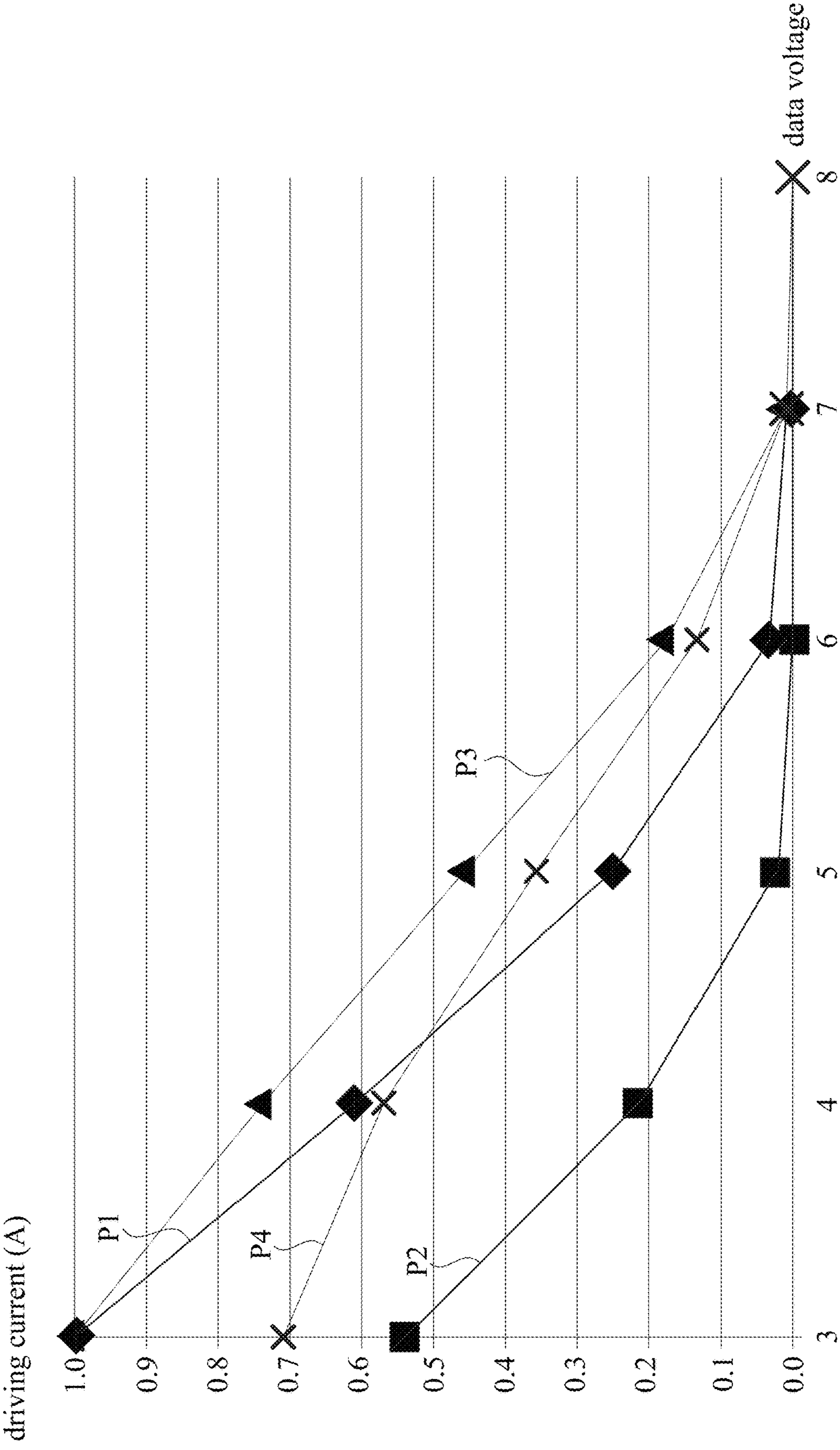
FIG. 4 depicts a schematic diagram of data voltages received by different pixel circuits versus driving currents curves according to some embodiments of the present disclosure.

FIG. 4 depicts a schematic diagram of a data voltage received by different pixel circuits versus a driving current curves P1-P4 according to some embodiments of the present disclosure. Horizontal axis coordinates of the voltage versus current curves P1-P4 represent the data voltage V data written by the pixel circuit 100, and its unit is volts (V). Vertical axis coordinates of the voltage versus current curves P1~P4 represent the driving current Id1 between the system voltage source VDD and the system voltage source VSS in the pixel circuit 100, and its unit is Ampere (A). The voltage versus current curve P1 is a voltage versus current curve of conventional pixel circuit that is close to a voltage source of the conventional pixel circuit. The voltage versus current curve P2 is a voltage versus current curve of conventional pixel circuit that is far away from the voltage source of the conventional pixel circuit. The voltage versus current curve P3 is a voltage versus current curve of the pixel circuit 100 that is close to a voltage source of the present disclosure. The voltage versus current curve P4 is a voltage versus current curve of the pixel circuit 100 that is far away from the voltage source of the present disclosure.

Please refer to FIG. 1, a path between the system voltage source VDD and the system voltage source VSS of the conventional pixel circuit has at least three transistors and light emitting elements. Please refer to FIG. 4, conventional pixel circuit is configured to receive the same data voltage (e.g. 3V or 5V). Since resistances of wirings increase with distance, a gap between the voltage versus current curve P1 and the voltage versus current curve P2 is very large.

Please refer to FIG. 1 again, a path between the system voltage source VDD and the system voltage source VSS of the pixel circuit 100 only has the driving transistor DT1, the transistor T1 and the light emitting element L1. Please refer to FIG. 4 again, through the transistor T2 of the pixel circuit 100 and the stage I13 in FIG. 2 of the present disclosure, a difference between the voltage versus current curves P3-P4 is narrowed compared to the difference between the voltage versus current curves P1-P2 to produce a compensation effect for the driving current Id1 in the farther pixel circuit 100.

Conventional driving circuits that drive micro-light-emitting diodes with different colors of light also occupy an area of a display device. Following paragraphs of the present disclosure will further improve an area of a display device according to the design of the pixel circuit 100 of the present disclosure.

Figure 5:
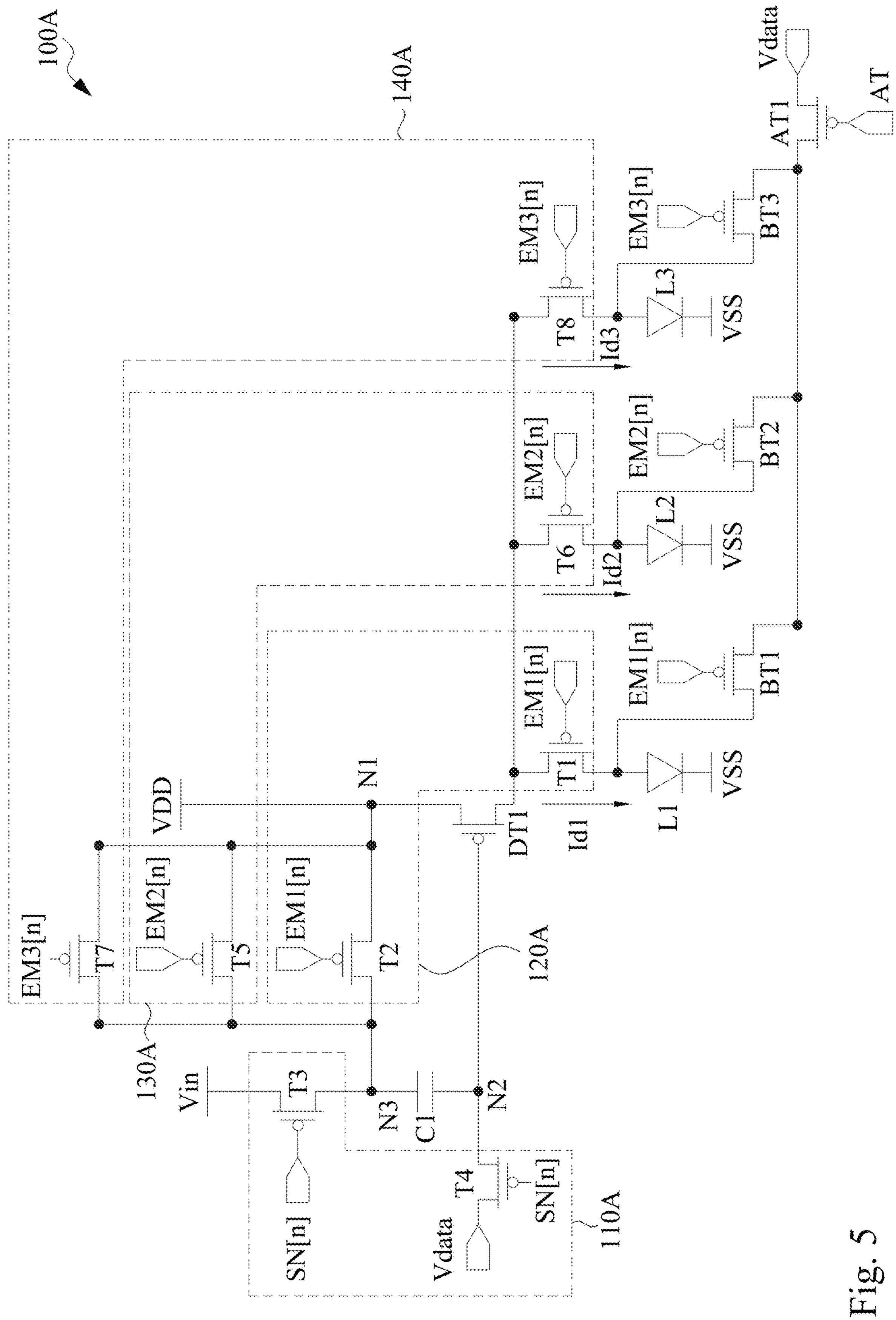
FIG. 5 depicts a schematic diagram of a pixel circuit according to some embodiments of the present disclosure.

FIG. 5 depicts a schematic diagram of the pixel circuit 100A according to some embodiments of the present disclosure. The pixel circuit 100A includes a light emitting element L1, a light emitting element L2, a light emitting element L3, a driving transistor DT1, a capacitor C1, a writing circuit 110A, a driving circuit 120A, a driving circuit 130A and a driving circuit 140A. The driving circuit 120A includes a transistor T1 and a transistor T2. The writing circuit 110A includes a transistor T3 and a transistor T4. The driving circuit 130A includes a transistor T5 and a transistor T6. The driving circuit 140A includes a transistor T7 and a transistor T8. The pixel circuit 100A further includes a detecting transistor AT1, bypass transistors BT1 to BT3. Connections between the light emitting element L1, the driving transistor DT1, the capacitor C1, the transistor T1 and transistor T2 of the driving circuit 120A, the transistor T3 and the transistor T4 of the writing circuit 110A, the bypass transistor BT1 and the detecting transistor AT1 are similar to the corresponding components of the pixel circuit 100 in FIG. 1, and repetitious detailed descriptions are omitted here. Following paragraphs will describe the structural differences between the pixel circuit 100 in FIG. 1 and the pixel circuit 100A in FIG. 5.

The driving circuit 130A and the driving circuit 140A are coupled to the node N1 and the node N3 like the driving circuit 120A. The driving circuit 120A, the driving circuit 130A and the driving circuit 140A share the driving transistor DT1, the capacitor C1 and the writing circuit 110A. Compared with conventional three-color sub-pixel circuit, this circuit sharing design reduces the area of the pixel circuit 100A to increase an aperture ratio of a transparent display device.

The transistor T1 of the driving circuit 120A is coupled to the light emitting element L1 and the driving transistor DT1. The transistor T6 of the driving circuit 130A is coupled to the light emitting element L2 and the driving transistor DT1. The transistor T8 of the driving circuit 140A is coupled to the light emitting element L3 and the driving transistor DT1.

The transistor T5 and the transistor T7 are connected in parallel to the transistor T2. The transistor T6 and the bypass transistor BT2 are connected in series. The transistor T6 and the bypass transistor BT2 are connected in parallel to the transistor T1 and the bypass transistor BT1. The transistor T8 and the bypass transistor BT3 are connected in series. The transistor T8 and the bypass transistor BT3 are connected in parallel to the transistor T2 and the bypass transistor BT2.

The transistor T5 includes a first terminal, a second terminal and a control terminal. The first terminal of the transistor T5 is coupled to the node N1. The second terminal of the transistor T5 is coupled to the node N3. The control terminal of the transistor T5 is configured to receive a driving signal EM2[n]. The transistor T5 is conducted in response to the driving signal EM2[n]. The transistor T6 includes a first terminal, a second terminal and a control terminal. The first terminal of the transistor T6 is coupled to the second terminal of the driving transistor DT1. The second terminal of the transistor T6 is coupled to the light emitting element L2. The control terminal of the transistor T6 is configured to receive the driving signal EM2[n]. The transistor T6 is conducted in response to the driving signal EM2[n].

The transistor T7 includes a first terminal, a second terminal and a control terminal. The first terminal of the transistor T7 is coupled to the node N1. The second terminal of the transistor T7 is coupled to the node N3. The control terminal of the transistor T7 is configured to receive a driving signal EM3[n]. The transistor T7 is conducted in response to the driving signal EM3[n]. The transistor T8 includes a first terminal, a second terminal and a control terminal. The first terminal of the transistor T8 is coupled to the second terminal of the driving transistor DT1. The second terminal of the transistor T8 is coupled to the light emitting element L3. The control terminal of the transistor T8 is configured to receive the driving signal EM3[n]. The transistor T8 is conducted in response to the driving signal EM3[n].

The bypass transistor BT2 includes a first terminal, a second terminal and a control terminal. The first terminal of the bypass transistor BT2 is coupled to the second terminal of the detecting transistor AT1. The second terminal of the bypass transistor BT2*s* coupled to the light emitting element L2. The control terminal of the bypass transistor BT2 is configured to receive the driving signal EM2[n]. The bypass transistor BT2 is conducted in response to the driving signal EM2[n]. The bypass transistor BT3 includes a first terminal, a second terminal and a control terminal. The first terminal of the bypass transistor BT3 is coupled to the second terminal of the detecting transistor AT1. The second terminal of the bypass transistor BT3 is coupled to the light emitting element L3. The control terminal of the bypass transistor BT3 is configured to receive the driving signal EM3[n]. The bypass transistor BT3 is conducted in response to the driving signal EM3[n]. It should be noted that the detection control signal AT received by the control terminal of the detecting transistor AT1 is only at a low level (e.g. the low level VGL in FIG. 3) during the detecting stage. At the display stages I1-I3, the detection control signal AT is at a high level (e.g. the high level VGH in FIG. 2), whose operation is similar to the operation of the detecting stage DI1 in FIG. 3, and repetitious detailed descriptions are omitted here.

In one embodiment, an optical wavelength of each of the light emitting element L1, the light emitting element L2 and the light emitting element L3 is different. For example, the light emitting element L1 can be a micro light-emitting diode (micro-LED) with a red light wavelength. The light emitting element L2 can be a micro light-emitting diode (micro-LED) with a green light wavelength. The light emitting element L3 can be a micro light-emitting diode (micro-LED) with a blue light wavelength. The light emitting element L1, the light emitting element L2 and the light emitting element L3 can be adjusted according to actual needs and are not limited to the embodiment of the present disclosure.

Figure 6:
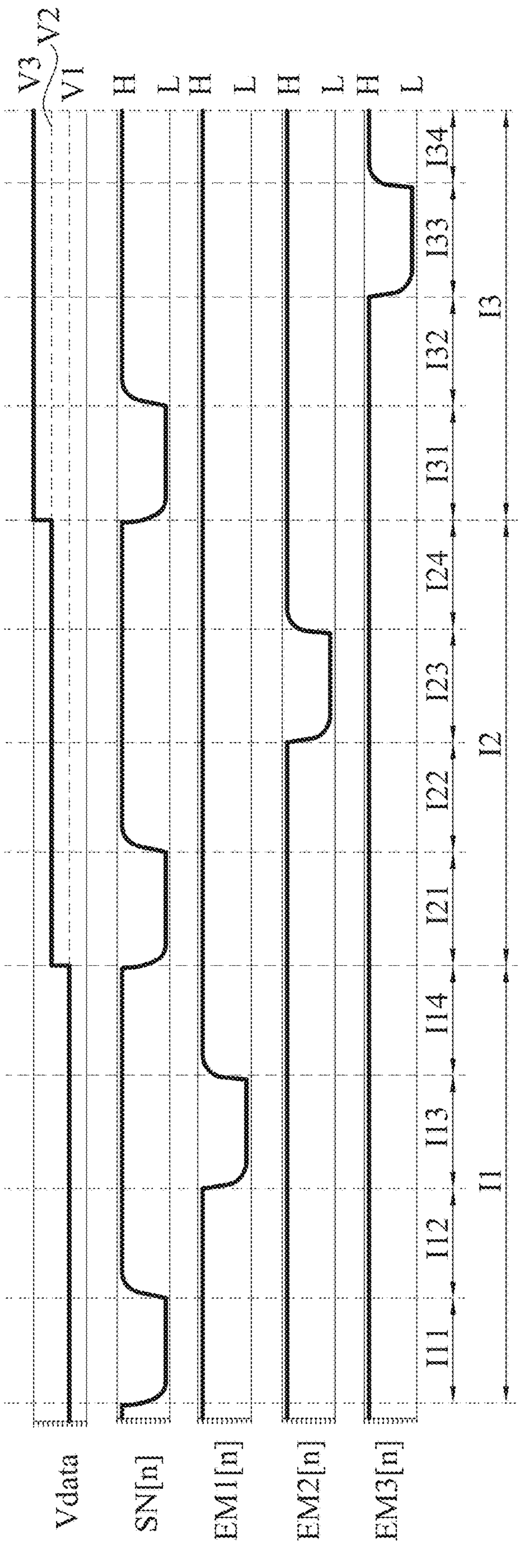
FIG. 6 depicts a signal timing diagram of a pixel circuit according to some embodiments of the present disclosure.

In order to facilitate the understanding operation of the pixel circuit 100A in FIG. 5, please refer to FIG. 6 together. FIG. 6 depicts a signal timing diagram of the pixel circuit 100A in FIG. 5 at the display stages I1 to I3 according to some embodiments of the present disclosure. The display stage I1 consists of stages I11 to I14. The display stage I2 consists of stages I21 to I24. The display stage I3 consists of stages stage I31 to I34. Operations of the display stages I1 to I3 in FIG. 6 are similar to the display stage I1 in FIG. 2. For the sake of brevity, only the differences are described below.

Please refer to the stage I11 of the display stage I1 in FIG. 6, the control signal SN[n] is at the low level L. The driving signal EM1[n], the driving signal EM2[n] and the driving signal EM3[n] are all at the high level H. The control signal SN[n] writes the initial voltage of the initial voltage source Vin to the first terminal (i.e. the node N3) of the capacitor C1 through the transistor T3 of the writing circuit 110A. The control signal SN[n] writes the data voltage Vdata from data line (not shown in the figure) to the second terminal (i.e. the node N2) of the capacitor C1 through the transistor T4 of the writing circuit 110A.

Please refer to the stage I13 of the display stage I1 in FIG. 6, the driving signal EM1[n] is at the low level L. The control signal SN[n], the driving signal EM2[n] and the driving signal EM3[n] is at the high level H. The transistor T1 and the transistor T2 of the driving circuit 120A are conducted in response to the driving signal EM1[n] to change the voltage level $V_{N2}$ of the node N2 and the voltage level $V_{N3}$ of the node N3 at the stage I11 so as to conduct the driving transistor DT1 to generate the driving current Id1 between the system voltage source VDD and the system voltage source VSS, flowing through the transistor T1 and the driving transistor DT1 to light up the light emitting element L1. Detail content of operations is similar to the stage I13 in FIG. 2, and repetitious detailed descriptions are omitted here.

Please refer to the stage I21 of the display stage I2 in FIG. 6, the control signal SN[n] is at the low level L. The driving signal EM1[n], the driving signal EM2[n] and the driving signal EM3[n] are at the high level H. The control signal SN[n] writes the initial voltage of the initial voltage source Vin to the first terminal (i.e. the node N3) the capacitor C1 through transistor T3 of the writing circuit 110A. The control signal SN[n] writes the data voltage Vdata from a data line (not shown in the figure) to the second terminal (i.e. the node N2) of the capacitor C1 through the transistor T4 of the writing circuit 110A. The data voltage Vdata can be inputted different voltage levels or the same voltage level according to actual needs.

Please refer to the stage I11 and the stage I21 in FIG. 6, the voltage level V2 of the data voltage Vdata at the stage I21 is higher than the voltage level V1 of the data voltage Vdata at the stage I11.

Please refer to the stage I23 of the display stage I2 in FIG. 6, the driving signal EM2[n] is at the low level L. The control signal SN[n], the driving signal EM1[n] and the driving signal EM3[n] are at the high level H. The transistor T5 and the transistor T6 of the driving circuit 130A are conducted in response to the driving signal EM2[n] to change the voltage level $V_{N2}$ of the node N2 and the voltage level $V_{N3}$ of the node N3 at the stage I21 so as to conduct the driving transistor DT1 to generate the driving current Id2 between the system voltage source VDD and the system voltage source VSS, flowing through the transistor T6 and the driving transistor DT1 to light up the light emitting element L2. Detail content of operations is similar to the stage I13 in FIG. 2, and repetitious detailed descriptions are omitted here.

Please refer to stage I31 of the display stage I3 in FIG. 6, the control signal SN[n] is at the level L. The driving signal EM1[n], the driving signal EM2[n] and the driving signal EM3[n] at the high level H. The control signal SN[n] writes the initial voltage of the initial voltage source Vin to the first terminal (i.e. the node N3) of the capacitor C1 through the transistor T3 of the writing circuit 110A. The control signal SN[n] writes the data voltage Vdata from the data line (not shown in the figure) to the second terminal (i.e. the node N2) of the capacitor C1 through the transistor T4 of the writing circuit 110A. The data voltage Vdata can be inputted different voltage levels or the same voltage level according to actual needs.

Please refer to the stage I11, the stage I21 and the stage I31 in FIG. 6, the voltage level V3 of the data voltage Vdata at the stage I31 is higher than the voltage level V1 of the data voltage Vdata at the stage I11 and the voltage level V2 of the data voltage Vdata at the stage I21.

Please refer to the stage I33 of the display stage I3 in FIG. 6, the driving signal EM3[n] is a the low level L. The control signal SN[n], the driving signal EM1 [n] and the driving signal EM2[n] are at the high level H. The transistor T7 and the transistor T8 of the driving circuit 140A is conducted in response to the driving signal EM3[n] to change the voltage level $V_{N2}$ of the node N2 and the voltage level $V_{N3}$ of the node N3 at the stage I31 so as to conduct the driving transistor DT1 to generate the driving current Id3 between the system voltage source VDD and the system voltage source VSS, flowing through the transistor T8 and the driving transistor DT1 to light up the light emitting element L3. Detail content of operations is similar to the stage I13 in FIG. 2, and repetitious detailed descriptions are omitted here.

To sum up, in addition to the advantages of the pixel circuit 100 in FIG. 1 the pixel circuit 100A in FIG. 5 allows micro-light emitting diodes of multiple colors to share the same driving circuit, thereby reducing the area of the pixel circuit and increasing an aperture ratio of a pixel device.

Based on the aforementioned embodiments, the present disclosure provides a pixel circuit to reduce a voltage difference between system voltage sources of a pixel circuit, thereby reducing power consumption. In addition, differences in driving currents between pixel circuits with different distances will also obtain a certain compensation effect. Finally, shared design of pixel circuits of the present disclosure can reduce an area of s pixel circuit and increase an aperture ratio of a pixel device.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A pixel circuit, comprising:

a light emitting element, coupled to a first system voltage source;

a driving transistor, coupled to a first node, a second node and a second system voltage source;

a capacitor, coupled to the second node and a third node;

a writing circuit, coupled to the second node and the third node, wherein the writing circuit is configured to write a data voltage and an initial voltage to both terminals of the capacitor respectively according to a control signal at a first stage;

a first transistor, coupled between the driving transistor and the light emitting element, wherein the first transistor is conducted in response to a driving signal at a second stage; and a second transistor, coupled to the first node and the third node, wherein the second transistor is conducted in response to the driving signal at the second stage to change the data voltage and the initial voltage at both terminals of the capacitor so that the driving transistor is conducted to generate a driving current between the first system voltage source and the second system voltage source, flowing through the driving transistor and the first transistor to light up the light emitting element.

2. The pixel circuit of claim 1, wherein the writing circuit comprises:

a third transistor, comprising:

a first terminal, coupled to an initial voltage source, and configured to receive the initial voltage from the initial voltage source at the first stage;

a second terminal, coupled to the capacitor and the third node; and a control terminal, configured to receive the control signal, wherein the third transistor is conducted in response to the control signal at the first stage; and a fourth transistor, comprising:

a first terminal, coupled to the capacitor;

a second terminal, configured to receive the data voltage from a data line; and a control terminal, configured to receive the control signal, wherein the fourth transistor is conducted in response to the control signal at the first stage.

3. The pixel circuit of claim 1, wherein the driving transistor comprising:

a first terminal, coupled to the first node;

a second terminal, coupled to the first transistor; and a control terminal, coupled to the second node, wherein the driving transistor is conducted in response to a voltage level of the second node.

4. The pixel circuit of claim 1, further comprising:

a bypass transistor, comprising:

a first terminal;

a second terminal, coupled to the light emitting element; and a control terminal, configured to receive the driving signal, wherein the bypass transistor is conducted in response to the driving transistor at the second stage; and a detecting transistor, comprising:

a first terminal;

a second terminal, coupled to the first terminal of the bypass transistor; and a control terminal, configured to receive a detection control signal, wherein the detecting transistor is conducted in response to the detection control signal at a detecting stage.

5. A pixel circuit, comprising:

a first light emitting element, coupled to a first system voltage source;

a driving transistor, coupled to a first node, a second node and a second system voltage source;

a capacitor, coupled to the second node and a third node;

a writing circuit, coupled to the second node and the third node, wherein the writing circuit is configured to write an initial voltage and a first data voltage to both terminals of the capacitor respectively according to a control signal at a first stage terminal;

a first driving circuit, coupled to the first node and the third node, wherein the first driving circuit is conducted in response to a first driving signal at a second stage to change the initial voltage and the first data voltage at both terminals of the capacitor at the first stage, so as to conduct the driving transistor, to light up the first light emitting element;

a second light emitting element, coupled to the first system voltage source; and a second driving circuit, coupled to the first node and the third node, wherein the writing circuit is configured to write the initial voltage and a second data voltage to both terminals of the capacitor according to the control signal at a third stage, wherein the second driving circuit is conducted in response to a second driving signal at a fourth stage to change the initial voltage and the second data voltage at both terminals of the capacitor at the third stage so as to conduct the driving transistor to light up the second light emitting element.

6. The pixel circuit of claim 5, wherein the writing circuit is configured to write the initial voltage and a third data voltage respectively according to the control signal at a fifth stage, wherein the pixel circuit further comprises:

a third light emitting element, coupled to the first system voltage source; and a third driving circuit, coupled to the first node and the third node, wherein the third driving circuit is conducted in response to a third driving signal at a sixth stage to change the initial voltage and the third data voltage at both terminals of the capacitor at the fifth stage so as to conduct the driving transistor to light up the third light emitting element.

7. The pixel circuit of claim 6, wherein an optical wavelength of each of the first light emitting element, the second light emitting element and the third light emitting element is different.

8. The pixel circuit of claim 6, wherein the driving transistor is conducted in response to a voltage level of the second node at the second stage so that a first driving current is generated between the first system voltage source and the second system voltage source to flow through the driving transistor and a first transistor of the first driving circuit, thereby lighting the first light emitting element, wherein the driving transistor is conducted in response to a voltage level of the second node at the fourth stage so that a second driving current is generated between the first system voltage source and the second system voltage source to flow through the driving transistor and a second transistor of the second driving circuit, thereby lighting the second light emitting element, wherein the driving transistor is conducted in response to a voltage level of the second node at the sixth stage so that a third driving current is generated between the first system voltage source and the second system voltage source to flow through the driving transistor and a third transistor of the third driving circuit, thereby lighting the third light emitting element.

9. The pixel circuit of claim 8, wherein the first transistor is coupled between the driving transistor an the first light emitting element, wherein the second transistor is coupled between the driving transistor and the second light emitting element, wherein the third transistor is coupled between the driving transistor and the third light emitting element.

10. The pixel circuit of claim 9, further comprising:
- a detecting transistor, comprising:
  - a first terminal;
  - a second terminal; and
  - a control terminal, configured to receive a detection control signal, wherein the detecting transistor is conducted in response to the detection control signal at a first detecting stage;
- a first bypass transistor, comprising:
  - a first terminal, coupled to the second terminal of the detecting transistor;
  - a second terminal, coupled to the first light emitting element; and
  - a control terminal, configured to receive the first driving signal, wherein the first bypass transistor is conducted in response to the first driving signal at the second stage;
- a second bypass transistor, comprising:
  - a first terminal, coupled to the second terminal of the detecting transistor;
  - a second terminal, coupled to the second light emitting element; and
  - a control terminal, configured to receive the second driving signal, wherein the second bypass transistor is conducted in response to the second driving signal at the fourth stage; and
- a third bypass transistor, comprising:
  - a first terminal, coupled to the second terminal of the detecting transistor;
  - a second terminal, coupled to the third light emitting element; and
  - a control terminal, configured to receive the third driving signal, wherein the third bypass transistor is conducted in response to the third driving signal at the sixth stage.

11. The pixel circuit of claim 6, wherein an optical wavelength of each of the first light emitting element, the second light emitting element and the third light emitting element is different.

12. The pixel circuit of claim 6, wherein the first data voltage, the second data voltage and the third data voltage are different from each other.

13. The pixel circuit of claim 8, wherein a current path of each of the first drive current, the second drive current and the third drive current are different.

14. The pixel circuit of claim 9, wherein the first transistor and the first bypass transistor are connected in series, wherein the second transistor and the second bypass transistor are connected in series, wherein the third transistor and the third bypass transistor are connected in series.

15. The pixel circuit of claim 10, wherein the first bypass transistor, the second bypass transistor and the third bypass transistor are connected in parallel.

* * * * *